US000001346H

United States Statutory Invention Registration [19]

[11] Reg. Number: H1346

Kluttz

[43] Published: Aug. 2, 1994

[54] FUNCTIONALIZATION OF POLYKETONE POLYMERS

[75] Inventor: Robert Q. Kluttz, Houston, Tex.

[73] Assignee: Shell Oil Company, Houston, Tex.

[21] Appl. No.: 894,486

[22] Filed: Jun. 5, 1992

[51] Int. Cl.[5] ..... C08G 67/02; C08K 3/32

[52] U.S. Cl. ..... 524/417; 525/539; 528/392

[58] Field of Search ..... 525/539; 528/392; 524/417

[56] References Cited

U.S. PATENT DOCUMENTS

| | | | |
|---|---|---|---|
| 5,021,496 | 6/1991 | Machado et al. | 524/414 |
| 5,106,680 | 4/1992 | King et al. | 428/373 |
| 5,122,564 | 6/1992 | George | 524/417 |
| 5,141,981 | 8/1992 | George et al. | 524/417 |

FOREIGN PATENT DOCUMENTS

| | | | |
|---|---|---|---|
| 0118312 | 9/1984 | European Pat. Off. | 528/392 |

OTHER PUBLICATIONS

Encyclopedia of Polymer Science and Engineering. vol. 10, John Wiley & Sons, New York (1987). pp. 369–373.

Loudon, G. Marc. "Organic Chemistry". Addison-Wesley, Reading, Mass. (1984). p. 1276.

*Primary Examiner*—Shean Wu

*Attorney, Agent, or Firm*—James O. Okorafor

[57] ABSTRACT

The invention discloses a novel method of functionalizing polyketone polymers by reacting with primary aromatic amines to form substituted pyrroles. The advantages of this method include but are not limited to permissible addition of small molecules to produce a wide variety of products, grafting of the polymer side chains to synthesize branched or comb polymers, and coupling reactions for controlling molecular weights.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUNCTIONALIZATION OF POLYKETONE POLYMERS

BACKGROUND OF THE INVENTION

Polyketone polymers are generally known in the art. Of particular interest among polyketone polymers is the class of linear alternating polymers of carbon monoxide and at least one ethylenically unsaturated hydrocarbon. This particular class of polyketone polymers is disclosed and claimed in numerous patents assigned to Shell Oil Company.

Functionalization of polymers is also generally known in the art. This field is very broad indeed and is well covered in both patent and open literature. Methods for functionalizing existing polymers are considered scientifically and technically valuable as they provide a means to rapidly synthesize a large number of structures. Synthesizing a single base polymer and subsequently adding ten different functional groups by a common procedure is generally much more efficient than synthesizing ten different base polymers from scratch. In addition, functionalization can give highly complex structures which cannot be produced by direct polymerization.

Functionalization of the above mentioned polyketones is difficult. Low solubility and high chemical resistance require extreme conditions to perform chemistry on polyketones. In most cases, unfortunately, the conditions required to initiate any reaction lead to rapid degradation of the polymer through crosslinking or chain scission.

It is well known that primary amines react with low molecular weight aliphatic 1,4-diketones to form pyrroles. It is also known in the art that polyethylene-co-carbon monoxide synthesized by a radical process can be induced to react with aniline to form a product which is intractable and unprocessable. However, a process has never been described whereby a high molecular weight, high melting point polyketone polymer may be reacted with a primary aromatic amine to yield a tractable, processable polymer of well-defined structure. The present invention discloses such a process by providing a method of covalently attaching other useful moieties to the polyketone chain without damaging the polymer.

SUMMARY OF THE INVENTION

This invention provides a novel method of functionalizing polyketone polymers through a grafting reaction. Accordingly, the invention provides a method of reacting polyketone polymers with primary aromatic amines to form substituted pyrroles in the backbone of the polymer chain. The aromatic amines may be substituted with a wide variety of substituents.

The advantages of the present invention are numerous and fall into several classes. One class is the addition of small molecule additives. Some examples of this class are addition of antioxidants for fiber and film applications, addition of dyes, addition of chromophores for optical applications, addition of compatibilizers for polymer blends, and addition of nonpolar groups to reduce the polarity of the polymer.

Another class of advantages is the grafting of polymer side chains to synthesize branched or comb polymers. One especially useful example is low level grafting of dissimilar polymer chains to increase dispersion in polymer alloys leading to improved properties.

Another class of the present invention advantages is coupling reactions. For example, addition of di- or polyfunctional aromatic amines gives a method for controlled increase of molecular weight and a method to synthesize branched polyketones.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer), and a primary amine compound. Generally speaking, the practice of this invention involves reacting suitable amounts or concentrations of these ingredients under suitable reaction conditions to form a substituted pyrrole compound. The reaction is generally illustrated by the following schematic:

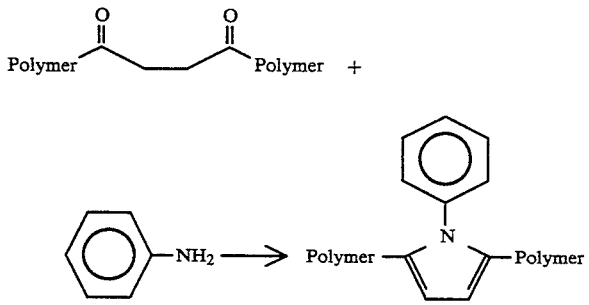

The polyketone polymers of this invention are well known in the art. Their method of preparation, properties, etc. are disclosed in numerous patents exemplified by U.S. Pat. No. 4,843,144 (van Broekhoven, et al) which is herein incorporated by reference.

The amines useful in the practice of this invention are primary aromatic amines. Primary amines are required to complete formation of pyrroles. Secondary and tertiary amines are undesirable as they either are unreactive or lead to undesired products. Aliphatic amines are likewise undesirable as they are more basic than aromatic amines. Under the herein disclosed reaction conditions aliphatic amines lead to excessive base catalyzed crosslinking.

The primary aromatic amines useful in the practice of this invention can be represented by the following general formula.

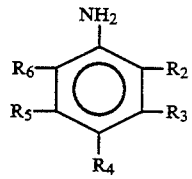

The R groups can be any group with the proviso that they should not excessively interfere in the grafting reaction nor should they induce undesirable side reactions. For example, the R groups may be hydrogen, hydrocarbyl, aryl, hydroxy, alkoxy, aryloxy, or sulfonyl. Two or more R groups may form fused polycyclic aromatic structures. R groups in the 2 and 6 positions will reduce the reactivity of the primary aromatic amine although in some applications this may be desirable. R groups in the 2, 4, and 6 positions will alter the rate of reaction through inductive effects. Again the desirability of this effect will depend on the particular application.

The molecular weight of the R group is not limited. For example, in an extreme case, the R group becomes the polymer backbone of the second class of applications. An example of extreme molecular weight R wherein the R group becomes a polymer backbone is Nylon 6,6 polymerized with excess adipic acid and terminated with phenylenediamine.

Examples of suitable primary aromatic amines include aniline, 2-naphthyl-amine, 1-naphthylamine, p-tolylamine, p-anisidine, p-aminophenol, 4-amino-m-cresol, 4-amino-o-cresol, 4-hexadecylaniline.

A specific subclass of primary aromatic amines comprises those primary aromatic amines in which one or more of the R groups incorporates additional primary aromatic amines. These compounds are capable of reacting with two or more polyketone polymer chains leading in a controllable way to branched structures and increased molecular weight. Examples of these difunctional primary aromatic amines include 4-aminophenyl ether, 4-aminophenyl sulfone, p-phenylenediamine, 1,4-bis-2-(2-(4-aminophenyl)propyl)benzene, and 1,4-bis-2-(2-(4-amino-3,5-dimethylphenyl)propyl)benzene.

The amount of aromatic amine useful in the practice of this invention varies with the desired application. The determination of these amounts, given a particular desired application, is within the competence of one skilled in the art. For purposes of illustration, when it is desired to alter the polarity of the resulting compound, a relatively large amount of aromatic amine i.e. 1–20 wt % is needed. Attaching antioxidant groups would typically require about 0.05–2 wt %. Grafting a polymer chain containing an aromatic amine moiety to the polyketone polymer chain requires very low quantities of aromatic amine i e. on the order of 0.1–100 parts per million.

The process of this invention comprises melt processing an intimate blend of polyketone polymer and primary aromatic amine at sufficient time and temperature to induce the reaction. Melt processing may be performed in a variety of processing equipment such as, for example, a Brabender plasticorder, a Banbury mixer, or a twin screw extruder. A twin screw extruder is particularly desirable as it allows maximum mixing with minimum time-temperature history. Suitable processing temperatures are from about 220° C. to 290° C. Below about 220° C. the polymer is not completely melted and above about 290° C. the melt stability of the polymer is poor. Preferably the processing temperature should be from about 240° to 260° C. Suitable processing times vary somewhat with the nature of the application and the reactivity of the primary aromatic amine. In general, the time required for complete mixing of the polyketone polymer and primary aromatic amine at 240° to 260° C. is sufficient for complete reaction. This may range from twenty seconds to ten minutes depending on the scale and type of processing equipment. Preferably the processing time is from forty-five seconds to three minutes.

The process may be further facilitated by addition of a melt processing stabilizer such as, for example, hydroxyapatite. The melt stabilizer minimizes undesirable side reactions without interfering in the grafting reaction. Suitable amounts of hydroxyapatite are 0.05% to 10%, preferably 0.1% to 3%, most preferably from 0.2% to 1% weight percent.

Although most of the examples which follow demonstrate controlled molecular weight increase by addition of difunctional primary aromatic amines, this is not be considered limiting for the other application classes.

EXAMPLE I

A linear alternating terpolymer of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 220° C. and a limiting viscosity number measured in m-cresol at 60° C. of 1.8 dl/g. This is a moderately high molecular weight polymer.

EXAMPLE II

A linear alternating terpolymer of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 220° C and a limiting viscosity number measured in m-cresol at 60° C of 1.08 dl/g. This is a very low molecular weight polymer.

EXAMPLE III

The polyketone polymer of Example I was extruded on a Baker-Perkins 15 mm twin screw extruder operating at a temperature of 240° C. The residence time in the extruder was about forty-five seconds. C13 NMR in hexafluoroisopropanol shows no significant change from the unprocessed nascent powder.

EXAMPLE IV

The polyketone polymer of Example I was dry blended with 1% 4-methoxy-aniline (p-anisidine) and 0.3% hydroxyapatite. The blend was extruded on a Baker-Perkins 5 mm twin screw extruder operating at a temperature of 240° C. The residence time in the extruder was about forty five-seconds. C13 NMR in hexafluoroisopropanol shows a signal at 104 ppm which is expected for a 2,5-disubstituted pyrrole.

EXAMPLES V–VII

Functionalized polyketone polymer compounds were prepared as described in Example III. The components of these compound are listed in Table I. The relative rate of crosslinking of these compounds were measured, and are reported in Table II.

EXAMPLE VIII

The polyketone polymer of Example II was extruded on a Baker-Perkins 15 mm twin screw extruder operating at a temperature of 240° C. The residence time in the extruder was about forty-five seconds. C13 NMR in hexafluoroisopropanol indicated no significant change from the unprocessed nascent powder.

EXAMPLES IX–XI

Functionalized polyketone polymer compounds were prepared as described in Example III using the low molecular weight polymer of Example II and varying amounts of dianiline ether. The proportions of the component parts of these compound are listed in Table I. The relative rate of crosslinking of these compounds were measured, and are reported in Table II.

TABLE I

Twin Screw Extruder Functionalization of Polyketone Polymers

| Example | LVN | Compound | Amount (%) | Hydroxyapatite (%) |
|---|---|---|---|---|
| III | 1.8 | None | 0 | 0 |
| IV | 1.8 | p-Anisidine | 1 | 0.3 |
| V | 1.8 | Hexadecylaniline | 1 | 0.3 |
| VI | 1.8 | p-Phenylenediamine | 1 | 0.3 |
| VII | 1.8 | Benzylamine | 1 | 0.3 |
| VIII | 1.08 | None | | |
| IX | 1.08 | Dianiline ether | 0.1 | 0.3 |
| X | 1.08 | Dianiline ether | 0.3 | 0.3 |
| XI | 1.08 | Dianiline ether | 1 | 0.3 |

TABLE II

Properties of Functionalized Polyketone Polymers: Effects of Different Primary Aromatic Amines

| Example | Effective LVN from Initial Viscosity | Relative Rate of Crosslinking |
|---|---|---|
| III | 1.8 | 325 |
| IV | 1.8 | 342 |
| V | 3.1 | 369 |
| VI | 4.0 | 263 |
| VII | too unstable to process | >10000 |

Although chemically very similar, the difunctional additives of Examples V and VI behave very differently from the monofunctional additives of Examples III and IV. The initial viscosities and crosslinking rates re unaffected by the monofunctional additives. The initial viscosities are increased by the difunctional additives. This indicates that the effective molecular weight of the polymer has increased. However, the relative rate of crosslinking does not change. This indicates that stability of the polymer has not been affected.Example VII demonstrates the need for non-basic amines. A more basic aliphatic amine such as benzyl amine increases the crosslinking rate to the point that the polymer can no longer be melt processed.

TABLE III

Effect of Varying Amount of Difunctional Primary Aromatic Amine

| Example | Initial LVN | Amount of Amine Added | Effective LVN After Processing |
|---|---|---|---|
| VIII | 1.08 | 0.0 | 1.12 |
| IX | 1.08 | 0.1 | 1.20 |
| X | 1.08 | 0.3 | 1.41 |
| XI | 1.08 | 1.0 | 1.90 |

Examples VIII–XI demonstrate the molecular weight control which can be achieved simply by controlling the amount of added difunctional primary aromatic amine.

EXAMPLE XII

Melt processing characteristics of the functionalization chemistry of polyketone polymers were tested by processing in a Brabender plasticorder at 240° C. until the polymer is no longer a viscous liquid. As a control the polyketone polymer from Example I was processed alone. Processing characteristics are listed in Table V. When the solid polymer is added the measured torque is, of course, very high. As the polymer melts, the torque drops to a minimum, usually after about three to five minutes of processing. As the polymer then crosslinks the torque rises to a maximum at which point the polymer converts from a viscous liquid to a soft, semi-solid sponge and the torque rapidly falls off. The minimum torque at melting, the maximum torque at decomposition, and the time to decomposition were measured.

EXAMPLE XIII

The polyketone polymer from Example I was dry blended with 0.5% p-anisidine. Processing characteristics were measured as in Example XII. Results are listed in Table V.

EXAMPLES XIV–XX

Functionalized polyketone polymer compounds were prepared and tested as described in Example XIII. The components of these compounds are listed in Table IV. Processing characteristics of these compounds were tested and are listed in Table V.

TABLE IV

Brabender Plasticorder Functionalization of Polyketone Polymers

| Example | Compound | Amount (%) |
|---|---|---|
| XII | None | 0 |
| XIII | p-Anisidine | 0.5 |
| XIV | p-Aminophenol | 0.5 |
| XV | 4-Amino-m-cresol | 0.5 |
| XVI | 4-Amino-o-cresol | 0.5 |
| XVII | 4-Hexadecylaniline | 0.5 |
| XVIII | p-Phenylenediamine | 0.5 |
| XIX | Dianiline ether | 0.5 |
| XX | Dianiline sulfone | 0.5 |

TABLE V

Process Characteristics in the Brabender Plasticorder

| Example | Min. Torque | Time to Dec. | Slope |
|---|---|---|---|
| XII | 112 | 121 | 2.2 |
| XIII | 111 | 142 | 1.8 |
| XIV | 131 | 128 | 2.1 |
| XV | 136 | 108 | 2.3 |
| XVI | 106 | 110 | 2.4 |
| XVII | 106 | 118 | 2.0 |
| XVIII | 199 | 36 | 10.1 |
| XIX | 152 | 87 | 3.3 |
| XX | 106 | 88 | 3.5 |

Examples XII–XVII show only the moderate variation associated with the test despite the structural differences of the primary aromatic amines. The effect of difunctional primary aromatic amines, Examples XVIII–XX, is most clearly shown by the minimum torque. Note the high minimum torque seen in Example XVIII. This shows that phenylenediamine has reacted extensively by the time the polymer is completely melted. Dianiline ether in Example XIX has also reacted but to a lesser extent. Dianiline sulfone in Example XX has hardly begun to react by the time the polymer melts as evidenced by the unaffected minimum viscosity. These are the expected results as sulfones are deactivating, ethers are moderately activating, and amines are highly activating. Thus, the processing characteristics of the blend can be controlled by the functionality of the primary aromatic amine as well as the quantity of the primary aromatic amine.

While this invention has been described in detail for the purpose of illustration, it is not to be construed as limited thereby but is intended to cover all changes and modifications within the spirit and scope thereof.

What is claimed is:

1. A method of producing functionalized polyketone polymers consisting essentially of reacting a linear alternating polymer of carbon monoxide and an ethylenically unsaturated hydrocarbon with at least one primary aromatic amine.

2. A method as in claim 1 wherein said primary aromatic amine is a difunctional amine.

3. A method as in claim 2 wherein said difunctional amine is a member of the group consisting of 4-aminophenyl sulfone, p-phenylenediamine, 1,4-bis-2-(2-(4-aminophenyl)propyl)benzene, and 1,4-bis-2-(2-(4-amino-3,5-dimethylphenyl)propyl)benzene.

4. A method as in claim wherein said primary aromatic amine is present in an amount of from about 1–20 wt %.

5. A method as in claim 1 wherein said reaction is conducted at a temperature of from about 220° C. to 290° C.

6. A method as in claim 1 further comprising the addition of a melt stabilizer.

7. A method as in claim 1 wherein said melt stabilizers is hydroxyapatite.

8. A method as in claim 7 wherein said hydroxyapatite is present in an amount of from about 0.05 to 10 wt %.

9. A shaped article of manufacture made from the product of claim 1.

10. A method of producing functionalized polyketone polymers consisting essentially of reacting a linear alternating polymer of carbon monoxide and an ethylenically unsaturated hydrocarbon with at least one aromatic amine;

wherein said primary amine is present in an amount of from about 11 ∝ 20 wt %;

wherein said reaction in conducted at a temperature of from about 240–°260° C.; and further comprising the addition of a melt stabilizer.

11. A method as in claim 10 wherein said primary aromatic amine is a difunctional amine selected from the group consisting of 4-aminophenyl sulfone, p-phenylenediamine, 1,4-bis-2-(2-(4-amino-phenyl)-propyl)benzene, and 1,4-bis-2-(2-(4-amino-3,5-dimethyl-phenyl)propyl)benzene.

12. A method as in claim 10 wherein said melt stabilizers is hydroxyapatite.

13. A method as in claim 12 wherein said hydroxyapatite is present in an amount of from about 0.2–1 wt %.

* * * * *